US006628300B2

(12) United States Patent
Amini et al.

(10) Patent No.: US 6,628,300 B2
(45) Date of Patent: Sep. 30, 2003

(54) TRANSCODING PROXY AND METHOD FOR TRANSCODING ENCODED STREAMS

(75) Inventors: Lisa Amini, Yorktown Heights, NY (US); Pascal Frossard, Harrison, NY (US); Pierre Vandergheynst, Berolle (CH); Olivier Verscheure, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/092,247

(22) Filed: Mar. 6, 2002

(65) Prior Publication Data

US 2003/0103563 A1 Jun. 5, 2003

Related U.S. Application Data

(60) Provisional application No. 60/334,514, filed on Nov. 30, 2001, and provisional application No. 60/334,521, filed on Nov. 30, 2001.

(51) Int. Cl.$^7$ ................................................ G09G 5/00
(52) U.S. Cl. ....................... 345/660; 348/401; 707/104; 382/103
(58) Field of Search ................................. 345/660, 598, 345/599, 664, 665, 667; 341/50; 707/104; 382/103; 348/401

(56) References Cited

U.S. PATENT DOCUMENTS

| 5,933,193 | A | * | 8/1999 | Niesen | 375/240.12 |
| 5,936,669 | A | * | 8/1999 | Niesen | 375/240.12 |
| 6,345,279 | B1 | * | 2/2002 | Li et al. | 707/104.1 |
| 6,480,615 | B1 | * | 11/2002 | Sun et al. | 382/103 |

* cited by examiner

Primary Examiner—Brian Young
Assistant Examiner—John Nguyen
(74) Attorney, Agent, or Firm—Douglas W. Cameron; Anne V. Dougherty

(57) ABSTRACT

An apparatus, a method and a system to efficiently manipulate in the compressed domain, spatial and/or temporal scaling of matching pursuit-coded digital signals. These manipulations, referred to as transcoding, may take place at a transcoding proxy located at an origin server, in any intermediary along the transmission path from the origin server to the client device, and/or at the client device. The preferred embodiment focuses on a method to perform rate adaptation and spatio-temporal scaling of a video stream composed of 3-D atoms in order to serve a set of heterogeneous client devices (e.g., a high-end personal computer, a personal digital assistant and a wireless phone). The proposed method applies to 1-D atoms (decomposition of audio signals) and 2-D atoms (image decomposition).

20 Claims, 8 Drawing Sheets

PDA Frame 0

PDA Frame 1

PDA Frame 2

PDA Frame 3

TRANSCODING PROXY AND METHOD FOR TRANSCODING ENCODED STREAMS

CROSS REFERENCE TO RELATED APPLICATIONS

This application claims the benefit under 35 USC 119(c) of U.S. provisional application No. 60/334,514 which was filed on Nov. 30, 2001. The application also relates to patent applications entitled "System and Method for Encoding Three-Dimensional Signals Using A Matching Pursuit Algorithm" and "System and Method for Equal Perceptual Relevance Packetization of Data", Ser. Nos. 10/092,767 and 10/091,933 respectively, both of which claim the benefit under 35 USC 119(c of U.S. provisional application No. 60/334,521 which was filed on Nov. 30, 2001.

FIELD OF THE INVENTION

This invention relates generally to digital signal manipulation, and more particularly to an apparatus, a method and a system to transcode matching pursuit-coded digital signals (e.g., audio, image, video) in a gateway (i.e., transcoding proxy).

BACKGROUND OF THE INVENTION

New classes of pervasive computing devices such as personal digital assistants (PDAs), hand-held computers (HHC) and smart phones give users more ubiquitous access to information than ever. Many of these devices have capabilities to serve as calendar tools, address books, web browsers, etc. As users are beginning to rely more heavily on pervasive computing devices, there is a growing need for applications to bring multimedia information to these devices. However, due to heterogeneous device capabilities, in terms of display size, storage, processing power, and network access, there are new challenges for designing appropriate tools that allow these devices to effectively access, store and process multimedia information. Concurrent with the developments in pervasive computing, advances in storage, networking, and authoring tools are driving the production of large amounts of rich multimedia content. The result is a growing mismatch between the available rich content and the capabilities of the client devices to access and process it.

Many researchers have been working on adapting multimedia content in so-called transcoding proxies. Transcoding proxies are typically located in access providers. Video transcoding includes spatial scaling (image size), temporal scaling (frame rate), rate reduction, and spatial rotation and translation. A good transcoding algorithm maximizes the trade-off between transcoding quality (quality of the manipulated signal) and related processing power. Processing power is indeed an issue in order for an access provider to scale to the demand, which is the reason why only compressed domain transcoding is viable.

The most cited multimedia standards for compression create bit streams that are delicate to manipulate in the compressed domain. A good transcoding quality implies a high processing power. Moreover signal manipulation is limited.

What is needed, therefore, and what is an objective of the present invention, is to provide an apparatus, method and system for transcoding signals in the compressed domain.

It is another objective of the present invention provides an apparatus, a method and a system to efficiently adapt the bit rate and manipulate, in the compressed domain, spatial and/or temporal scaling of matching pursuit coded digital signals.

Yet another objective of the invention is to provide the foregoing manipulations, usually referred to as transcoding, at an origin server or at any intermediary along the transmission path from the origin server to the client device, including at the client device.

SUMMARY OF THE INVENTION

The foregoing and other objectives are realized by the present invention comprising an apparatus, a method and a system to efficiently manipulate, in the compressed domain, spatial and/or temporal scaling of matching pursuit coded digital signals. The transcoding may take place at an origin server, in any intermediary along the transmission path from the origin server to the client device, or in the client device. The preferred embodiment focuses on a method to perform rate adaptation and spatial and temporal scaling of a video stream composed of atoms output by matching pursuit coding of digital signals in order to serve a set of heterogeneous client devices (e.g., a high-end personal computer, a personal digital assistant and a wireless phone). The proposed preferred method is implemented in a transcoding proxy sitting in an intermediary node along the transmission path. The same strategy applies to 1-D atoms (decomposition of audio signals) and 2-D atoms (image decomposition).

BRIEF DESCRIPTION OF THE DRAWINGS

The advantages of the present invention will become readily apparent to those ordinarily skilled in the art after reviewing the following detailed description and accompanying drawings, wherein.

DETAILED DESCRIPTION OF THE INVENTION

The method of the present invention is useful in a variety of applications where it is desired to produce a low to medium bit rate video stream to be delivered over an error-prone network and decoded by a set of heterogeneous devices. More specifically, the method of the present invention operates on digital signals that have been encoded using matching pursuit algorithms. Matching Pursuit (MP) is an adaptive algorithm that iteratively decomposes a function $f \in L^2(R)$ (e.g., audio, image, video) over a possibly redundant dictionary of functions called atoms. It outputs a stream composed of both atom parameters and their respective correlation coefficient. Let $D=\{g_\gamma\}_{\gamma\in\Gamma}$ be a dictionary with $\|g_\gamma\|=1$. f is first decomposed into:

$$f=(g_{\gamma 0}|f)g_{\gamma 0}+Rf,$$

where $(g_{\gamma 0}|f)g_{\gamma 0}$ represents the projection of f onto $g_{\gamma 0}$ and Rf is the residual component. After N iterations, one has the following decomposition for f:

$$f = \sum_{n=0}^{N-1} \langle g_{\gamma n} | R^n f \rangle g_{\gamma n} + R^N f,$$

with $R^0 f=f$.

The art in Matching Pursuit (MP) coding is somewhat limited. A publication by S. G. Mallat and Z. Zhang, entitled "*Matching Pursuits With Time-Frequency Dictionaries*", Transactions on Signal Processing, Vol. 41, No. 12, December 1993 details one application of matching pursuit coding. In addition, the publication entitled "*Very Low Bit-Rate Video Coding Based on Matching Pursuits*", by R. Neff and A. Zakhor, Circuits and Systems for Video Technology, Vol. 7, No. 1, February 1997, the publication entitled "*Decoder Complexity and Performance Comparison of Matching Pursuit and DCT-Based MPEG-4 Video Codecs*", by R. Neff, T. Nomura and A. Zakhor, Circuits and Systems for Video Technology, Vol. 7, No. 1, February 1997, and U.S. Pat. No. 5,699,121, detail using a 2-D matching pursuit coder to compress the residual prediction error resulting from motion prediction.

Matching pursuit algorithms usually rely on a structured dictionary. A structured dictionary is built by applying meaningful transformations to a generating function. These transformations include rotation, translation and dilation. Generally, these transformations combine into a group. Let G denote such a group. The method in the present invention strongly relies on the following fact: if G contains dilations, translations and/or rotations, a scaled, translated and/or rotated version of the original signal f can be reconstructed from the original matching pursuit coefficients by using appropriately scaled, translated and/or rotated atom indexes.

Let first the dictionary define the set of basic functions used for the signal representation. The basic functions are called atoms. The atoms are represented by a possibly multi-dimensional index $\gamma$, and the index along with a correlation coefficient $c_{\gamma 1}$ forms an MP iteration.

Figure 1:
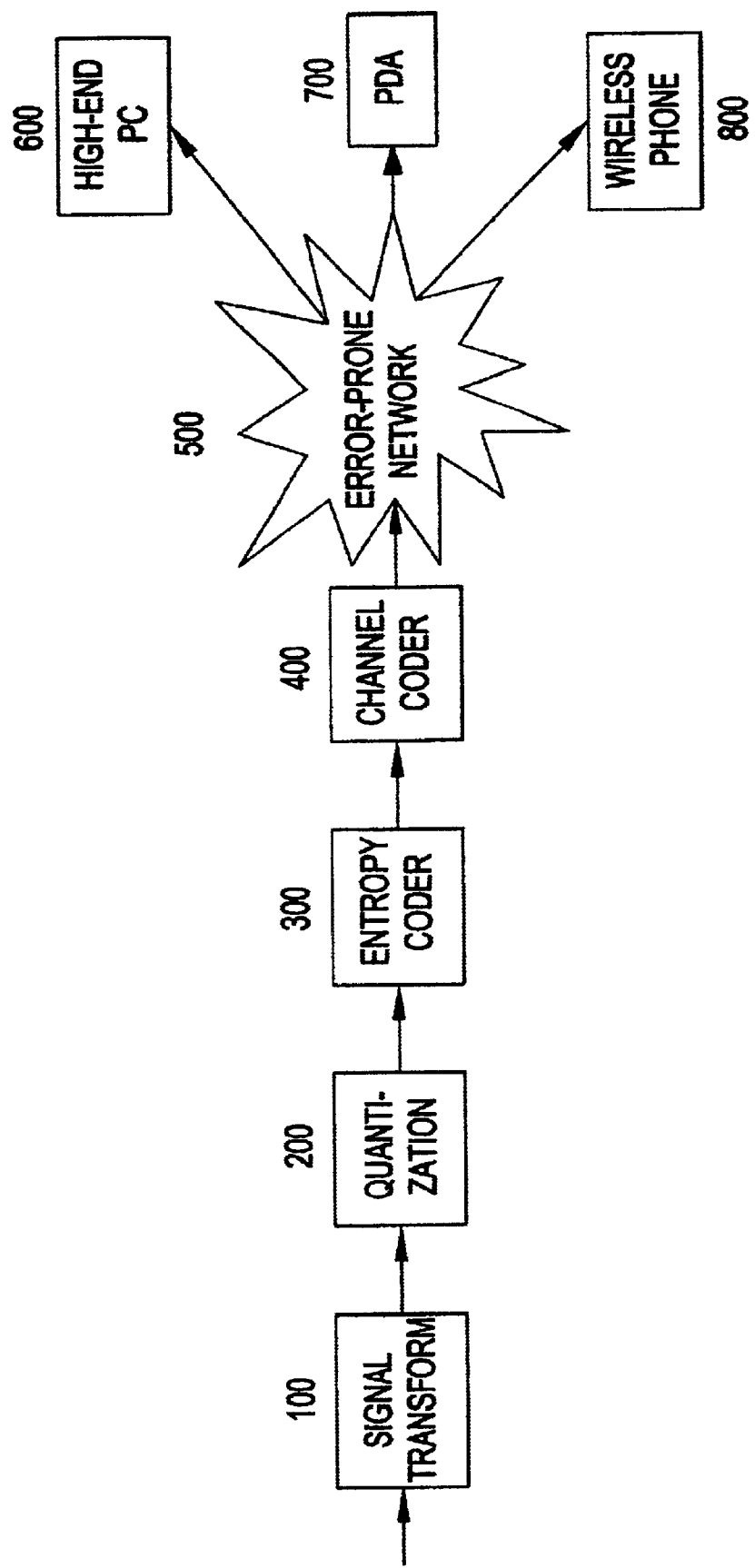
FIG. 1 is a block diagram illustrating the overall architecture in which the present invention takes place.
Figure 2:
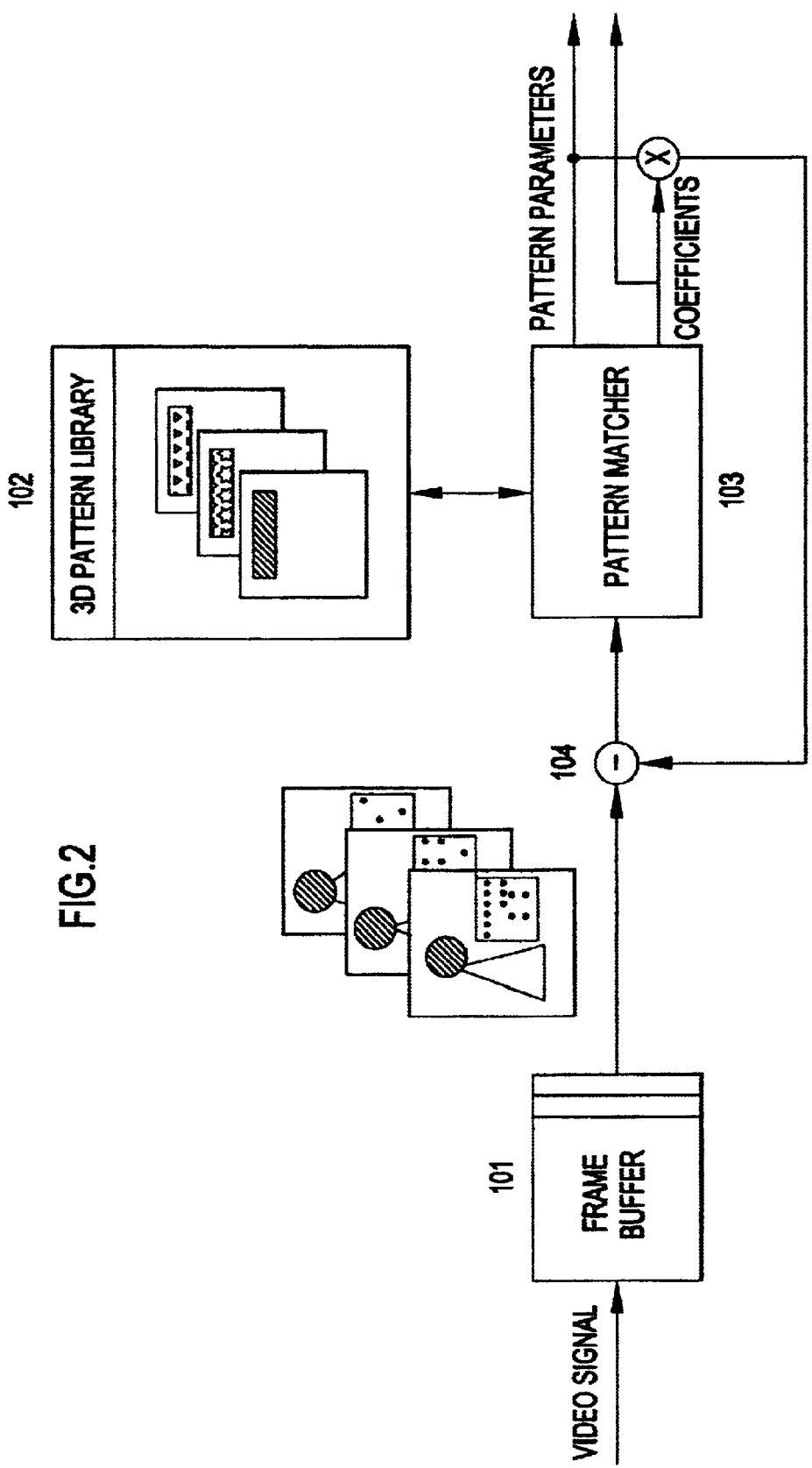
FIG. 2 illustrates the Signal Transform Block 100 from FIG. 1.
Figure 3:
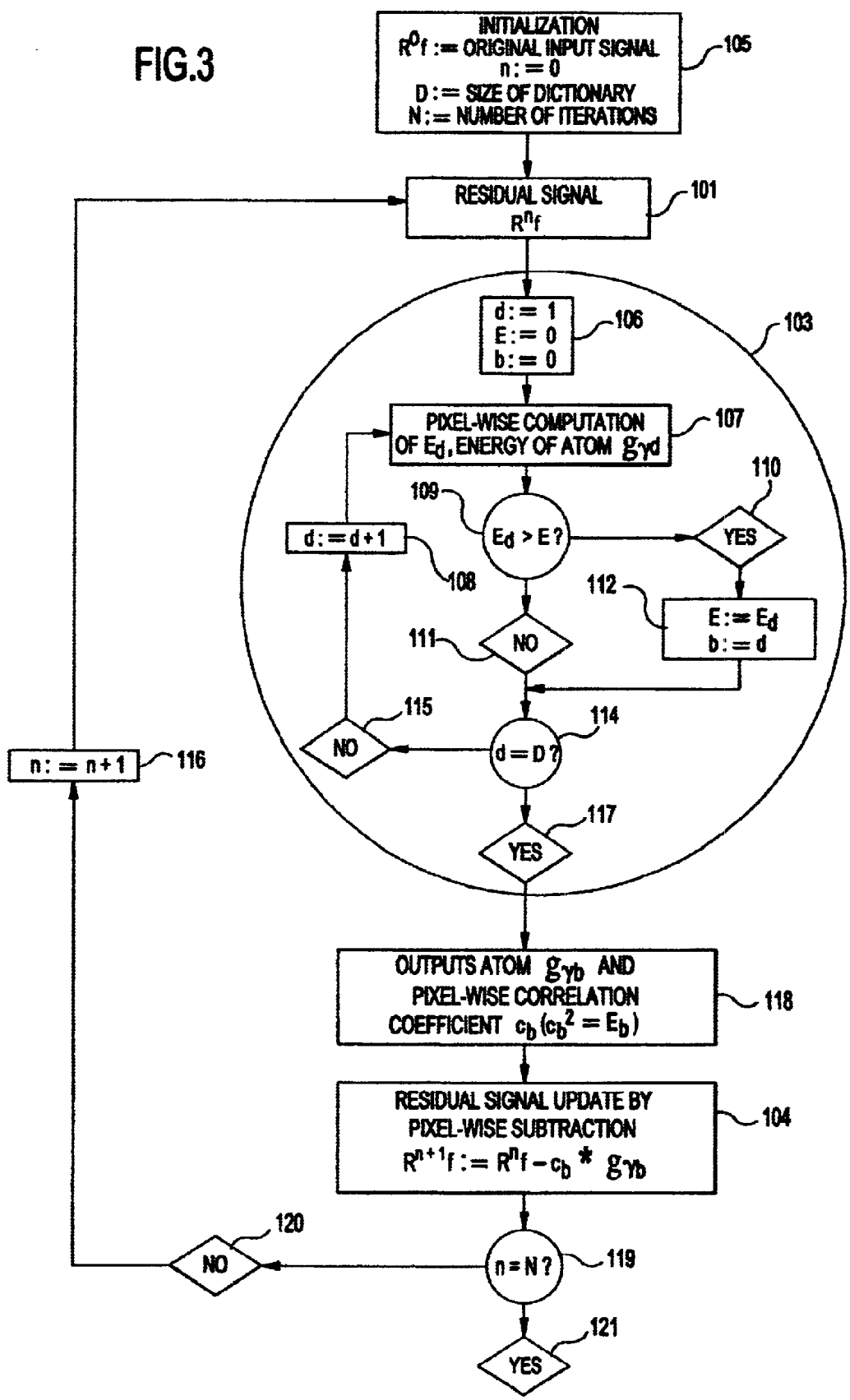
FIG. 3 is a flow graph illustrating the Matching Pursuit iterative algorithm of FIG. 2.

Encoding of 3-dimensional signals had not previously been addressed in the matching pursuit art. As set forth herein, and in co-pending patent applications assigned to the present assignee, the following method provides a system and method for matching pursuit encoding of three-dimensional signals. As illustrated in FIG. 2, the original video signal f is first passed to a Frame Buffer 101 to form groups of K video frames of dimension X×Y. The method thus decomposes the input video sequence into K-frames long independent 3D blocks. The dictionary 102 is composed of atoms, which are also 3-D functions of the same size, i.e., K×X×Y. The method as shown in FIG. 3 iteratively compares the residual 3-D function with the dictionary atoms and elects in the Pattern Matcher 103 the 3-D atom that best matches the residual signal (i.e., the atom which best correlates with the residual signal). The parameters of the elected atom, which are the index $\gamma$ and the coefficient $c_{\gamma 1}$ are sent across to the following block performing the coding (i.e., quantization, entropy coding probably followed by channel coding, as shown in FIG. 1). The pursuit continues up to a predefined number of iterations N, which is either imposed by the user, or deduced from a rate constraint and/or a source coding quality constraint.

The method relies on a structured 3-D dictionary 102, which allows for a good trade-off between dictionary size and compression efficiency. In the disclosed method, the dictionary is constructed from separable temporal and spatial functions, since features to capture are different in spatial and temporal domains. An atom dictionary is therefore written as $g_\gamma(x,y,k)=\Psi^{-1}\times S_{\gamma s}(x,y)\times T_{\gamma t}(k)$, where $\gamma$ corresponds to the parameters that transform the generating function. The parameter $\Psi$ is chosen so that each atom is normalized, i.e., $\|g_\gamma(x,y,k)\|^2=1$. Each entry of the dictionary therefore consists in a series of 7 parameters. The first 5 parameters specify position, dilation and rotation of the spatial function of the atom, $S_{\gamma s}(x\ y)$. The last 2 parameters specify the position and dilation of the temporal part of the atom, $T_{\gamma t}(k)$.

The spatial function in the method is generated using B-splines, which present the advantages of having a limited and calculable support, and optimizes the trade-off between compression efficiency (i.e., source coding quality for a given target bit rate) and decoding requirements (i.e., CPU and memory requirements to decode the input bit stream). A B-spline of order n is given by:

$$\beta^n(x) = \frac{1}{n!}\sum_{k=0}^{n+1}\binom{n+1}{k}(-1)^k\left[x-k+\frac{n+1}{2}\right]_+^n,$$

where $[y]^n_+$ represents the positive part of $y^n$.

The 2-D B-spline is formed with a 3rd order B-spline in one direction, and its first derivative in the orthogonal direction to catch edges and contours. Rotation, translation and anisotropic dilation of the B-spline generates an overcomplete dictionary. The anisotropic refineiment permits to use different dilation along the orthogonal axes, in opposition to Gabor atoms. The resulting spatial dictionary maximizes the trade-off between coding quality and decoding complexity for a specified source rate. The spatial function of the 3-D atoms can be written as $S_{\gamma s}=S^x_{\gamma x}\times S^y_{\gamma y}$, with:

$$S^x_{\gamma x}(x) = \beta^3\left(\frac{\cos(\varphi)(x-p_x)+\sin(\varphi)(y-p_y)}{d_x}\right),$$

$$S^y_{\gamma y}(y) = \beta^2\left(\frac{\sin(\varphi)(x-p_x)-\cos(\varphi)(y-p_y)}{d_y}+\frac{1}{2}\right) -$$

$$\beta^2\left(\frac{\sin(\varphi)(x-p_x)-\cos(\varphi)(y-p_y)}{d_y}-\frac{1}{2}\right).$$

The index $\gamma_s$ is thus given by 5 parameters, these are two parameters to describe an atom's spatial position $(p_x,p_y)$ two parameters to describe the spatial dilation of the atom $(d_x,d_y)$, and the rotation parameter $\phi$.

The temporal function is designed to efficiently capture the redundancy between adjacent video frames. Therefore $T_{\gamma t}(k)$ is a simple rectangular function written as:

$$T_{\gamma t}(k) = \begin{cases} 1 & \text{if } p_k \le k < p_k + d_k \\ 0 & \text{otherwise} \end{cases}.$$

The temporal index $\gamma_t$ is here given by 2 parameters; one parameter to describe the atom's temporal position $P_k$ and one parameter to describe the temporal dilation $d_k$.

The index parameters range $(p_x,p_y,p_k,d_x,d_y,d_k,\phi)$ is designed to cover the size of the input signal. Spatial-temporal positions allow to completely browse the 3D input signal, and the dilations values follow an exponential distribution up to the 3D input signal size. The basic functions may however be trained on typical input signal sets to determine a minimal dictionary, trading off the compression efficiency.

FIG. 1 is a block diagram illustrating the overall architecture in which the present invention takes place. The Signal Transform block 100 is the place at which the foregoing transformation takes place. After transformation, the digital signal is quantized 200, entropy coded 300 and packetized 400 for delivery over the error-prone network 500. A wide range of decoding devices are targeted; from a high-end PC 600, to PDAs 700 and wireless devices 800.

FIG. 2 illustrates the Signal Transform Block 100. The video sequence is fed into a frame buffer 101, and where a spatio-temporal signal is formed. This signal is iteratively compared to functions of a Pattern Library 102 through a Pattern Matcher 103. The parameters of the chosen atoms are then sent to the quantization block 200, and the corresponding features are subtracted from the input spatio-temporal signal.

FIG. 3 is a flow chart illustrating the Matching Pursuit iterative algorithm of FIG. 2. The Residual signal 101, which consists in the input video signal at the beginning of the Pursuit, is compared to a library of functions and a Pattern matcher 103 elects the best matching atom. The contribution of the chosen atom is removed from the residual signal 104 to form the residual signal of the next iteration.

The Pattern Matcher 303 basically comprises an iterative loop within the MP algorithm main loop, as shown in FIG. 3. The residual signal is compared with the functions of the dictionary by computing, pixel-wise, the correlation coefficient between the residual signal and the atom. The square of the correlation coefficient represents the energy of the atom (107). The atom with the highest energy (112) is considered as the atom that best matches the residual signal characteristics and is elected by the Pattern Matcher. The atom index and parameters and sent across (118) the Entropy Coder as shown in FIG. 2, and the residual signal is updated in consequence (104). To increase the speed of the encoding, the best atom search can be performed only on a well-chosen subset of the dictionary functions. However, such a method may result in a sub-optimal signal representation.

Once the signals (whether 1D, 2D, or 3D) are encoded by matching pursuit algorithms, it may become necessary to adapt and scale the resulting streams for use at the client devices. While transcoding proxies have addressed the need for delivering the same multimedia presentation to a variety of devices with varying capabilities (screen resolution, decoding power, access link) over heterogeneous networks, there is no transcoding proxy available for matching pursuit encoded digital signals (e.g., image, video).

Figure 4:
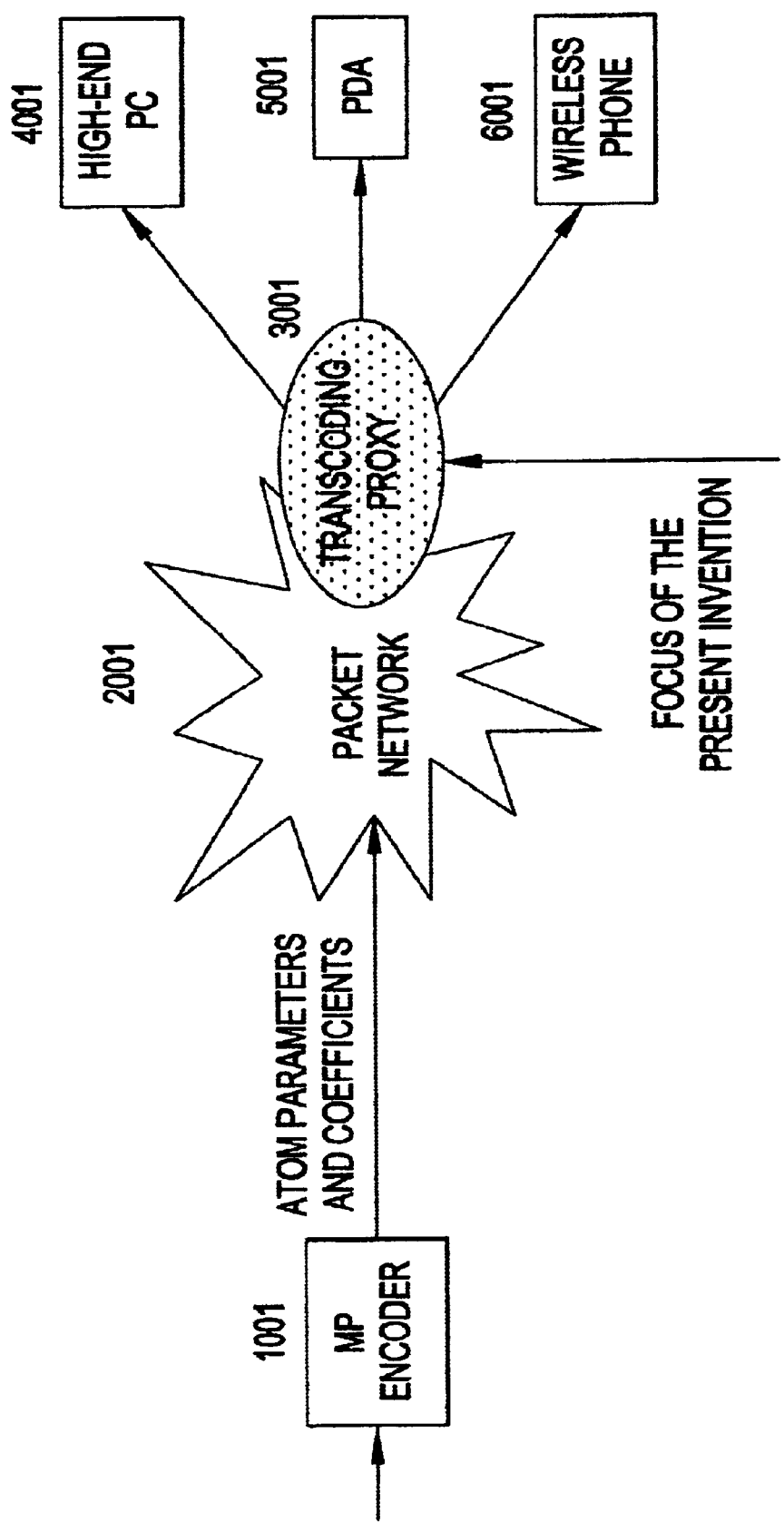
FIG. 4 represents an end-to-end transmission system in which the present invention is implemented.

With reference to FIG. 4, the preferred embodiment focuses on a method to perform rate adaptation and spatial and temporal scaling of a video stream output by an MP encoder 1001, and composed of 3-D atoms, in order to serve a set of heterogeneous client devices (e g., a high-end personal computer 4001, a personal digital assistant 5001 and a wireless phone 6001). The proposed method is implemented in a transcoding proxy 3001 sitting in the access provider (gateway) close to the end-users which receives the stream from MP Encoder 1001 via packet network 2001. The detailed description will focus on the 3D implementation. From the detailed description, however, it will be apparent to those having skill in the art that the same strategy applies to 1-D atoms (decomposition of audio signals) and 2-D atoms (image decomposition).

Figure 5:
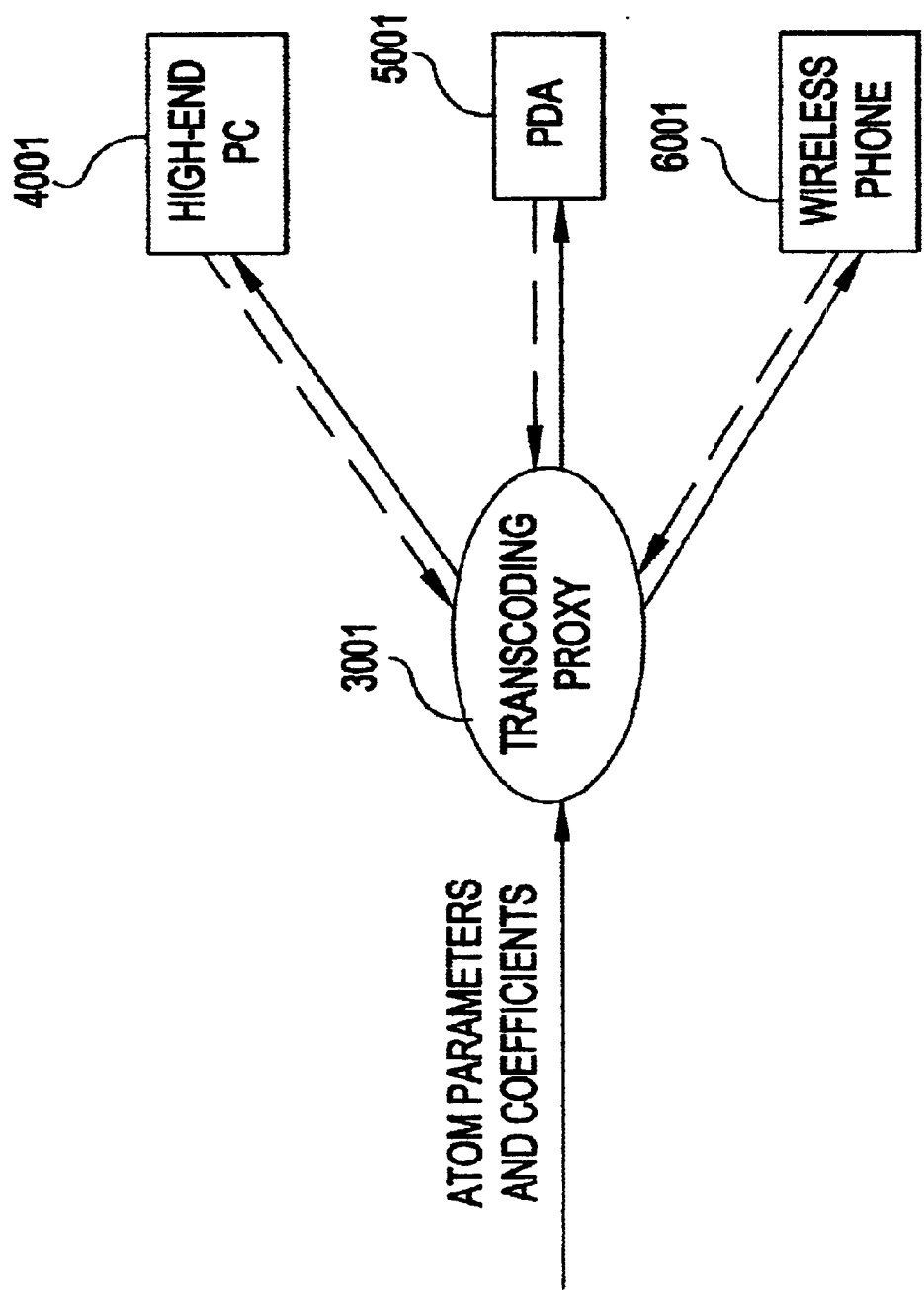
FIG. 5 is a block diagram that illustrates the succession of operations to spatially scale either 2-D image atoms or 3-D video atoms.

A client device 4001, 5001, or 6001 requests a video asset from the transcoding proxy via a communication data protocol. The protocol is in charge of making sure that the transcoding proxy knows about the device capabilities in terms of CPU, memory, display resolution and color depth. With reference to FIG. 5, the transcoding proxy 3001 receives end-device capability and quality feedback information from at least one of the high end PC 4001, the PDA 5001, and the wireless phone 5001. The transcoding proxy 3001 then forwards the request back to the origin server, which starts streaming the video asset.

The transcoding proxy is fed a succession of data packets containing self-decodable 3-D atoms from the MP Encoder. Each structured atom is composed of seven parameters $(p_x,p_y,p_k, d_x,d_y,d_k,\phi)$ and is accompanied by a correlation coefficient $c_{\gamma 1}=(g_{\gamma 1}|R^i)$. The atom parameters consist of three positioning parameters, three scaling parameters and one parameter for spatial rotation. The transcoding proxy retrieves the original spatial and temporal resolutions of the video asset (e.g., W×H×F). The scaling factors a (spatial scaling factor) and β (temporal scaling factor) are computed from the end-device capabilities and video asset parameters (W, H, F and decoding complexity). The number of iterations forwarded to the end-device may also be restrained to limit the utilized bandwidth. Indeed, some atoms may become negligible after downsizing so that they become worthless to the end-device. The decision to send atoms or not is taken by the transcoding proxy according to both the atom energy as given by the corresponding correlation coefficient and the available bandwidth.

Figure 6:
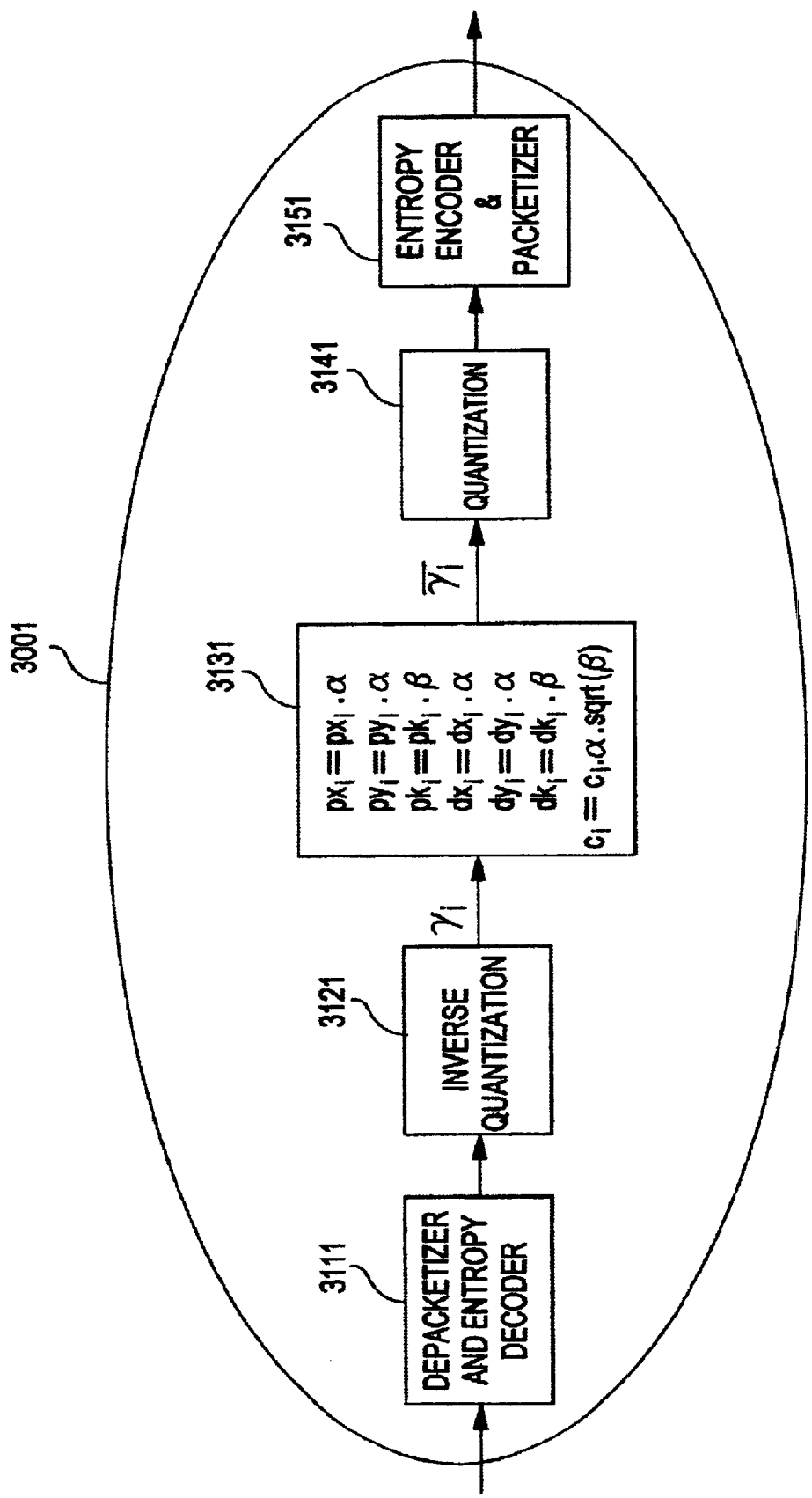
FIG. 6 illustrates the behavior of the Transcoding Proxy in greater detail.

The output of the Matching Pursuit encoder is generally encoded prior to transmission. With reference to FIG. 6, in the transcoding proxy 3001, the atom coefficients and parameters may thus have first to be extracted out of the data packets (depacketization and entropy decoding) and inversed quantized. The stream is depacketized and entropy-encoded at 3111. Inverse quantization is then performed onto MP coefficients at 3121. Each iteration then is adapted in the whereby coefficients and atom indexes are adapted to the client capabilities by multiplication in Transcoder 3131. Finally, quantization 3141, entropy encoding and packetization 3151 may follow to reconstruct a compressed data packet stream. It has to be noted that the Transcoder may be placed in the end-device itself.

Figure 7:
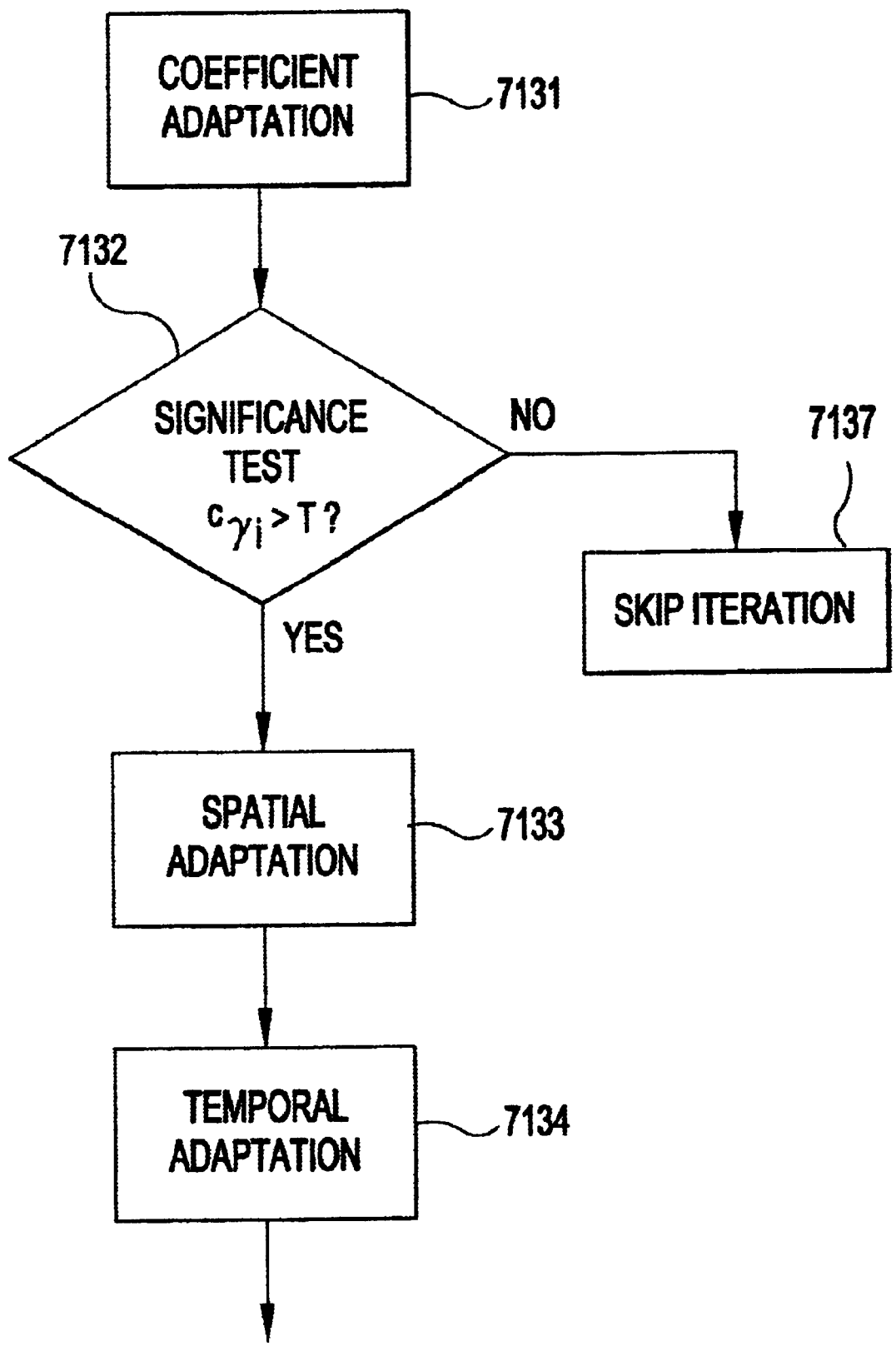
FIG. 7 depicts a representative process flow for the Transcoder.

The Transcoder 3131 operates as follows, with specific reference to FIG. 7. The coefficients must first be multiplied by $\alpha\sqrt{\beta}$ in 7131 to preserve the norm. If the resulting coefficient is considered significant when compared to a negotiated threshold T, as determined in step 7132, the atom parameters are then adapted at steps 7133 and 7134. Note that the threshold can be adapted to meet bandwidth constraints and ensure that the transcoding output rate is compliant with the channel availability as negotiated with the end-device. The parameters, including the spatial positions $(p_x,p_y)$, and the spatial dilations $(d_x,d_y)$, are multiplied by the spatial scaling factor a at 7133. Spatial scaling adapts the spatial resolution of the original signal to the display resolution of the decoding device. It is to be noted that the spatial scaling can be effectively used for zooming. Next $p_k$ and $d_k$ are multiplied by the temporal scaling factors β at 7134. If the coefficient is not considered significant, as determined at 7132, the iteration is simply skipped at 7137 and the Transcoder continues with the next MP iteration. Hence in the Transcoder 3131, the original video asset f of size W×H and frame rate F is transformed into a video signal $\hat{f}$ of size α.W×α.H and frame rate β.F corresponding to the client capabilities by:

$$\tilde{f} = \alpha\sqrt{\beta}\sum_{i=0}^{\tilde{N}} c_{\gamma i}\tilde{g}_{\gamma i},$$

where $\tilde{g}_{\gamma i}$ corresponds to the scaled version of the atom and $\tilde{N}$ correspond to the number of significant atoms. Thus, the parameters $(p_x,p_y,p_k,d_x,d_y,d_k,\phi)$ of the original video asset become $(\alpha.p_x,\alpha.p_y,\beta.p_k, \alpha.d_x,\alpha.d_y,\beta.d_k,\phi)$.

Figure 8:
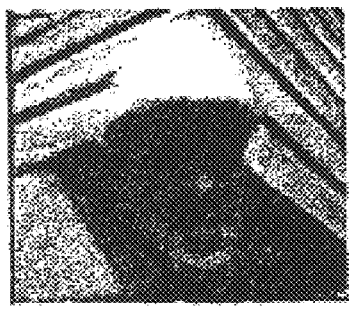
FIG. 8 shows an example of a CIF MP-encoded sequence (352×288 pixels images at 30 fps), which has been transcoded in the proxy and decoded at a PDA resolution of 100×80 pixels images at 30 fps.
Figure 8:
Figure 8:
Figure 8:
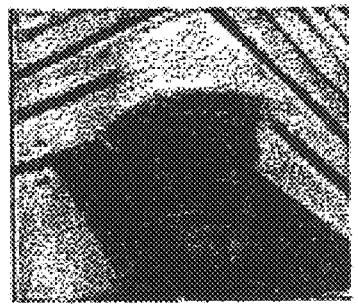

FIG. 8 shows an example of a CIF Mp-encoded sequence (352×288 pixels images at 30 fps) that has been transcoded in the proxy and decoded at a PDA resolution of 100×80 pixels images at 30 fps The described method may take place either at the origin server where the media is compressed, within the network in so-called intermediary nodes along the transmission path, or/and in the decoding device before the media is presented to the user. It is also to be noted that the rate adaptation can be performed independently of any spatio-temporal resizing. In such an implementation, the last iterations are simply discarded in order to meet the bandwidth constraints, taking advantage of the embedded property of the MP stream.

The invention has been described with reference to preferred embodiments. It will be apparent to one having skill in the art that modifications can be made, such as applying the transcoding to one and two dimensional streams, without departing from the spirit and scope of the invention as set forth in the appended claims.

What is claimed is:

1. A method of performing scaling and rate reduction of an encoded information stream containing first parameters and first correlation coefficients in order to serve at least one of a plurality of heterogeneous devices, said method comprising:
   a. determining scaling factors from device capabilities of said at least one device; and
   b. applying said scaling factors to said first parameters and first correlation coefficients to determine a new set of second parameters and second correlation coefficients, wherein said device can decode said second parameters and said second correlation coefficients.

2. The method of claim 1 further comprising filtering said second parameters and second correlation coefficients to adjust the rate of the said stream.

3. The method of claim 1 wherein said determining said spatial and temporal scaling factors comprises receiving input from said at least one device.

4. The method of claim 2 wherein said determining said spatial and temporal scaling factors comprises receiving input from said at least one device.

5. The method of claim 2 wherein said determining, scaling and filtering are conducted at a transcoding proxy.

6. The method of claim 4 wherein said transcoding proxy is located along the transmission path between an originating server and the at least one device.

7. The method of claim 4 wherein said transcoding proxy is located at a server at which the stream originates.

8. The method of claim 4 wherein said transcoding proxy is located at the at least one device.

9. The method of claim 1 wherein said scaling factors comprise spatial and temporal scaling factors.

10. Apparatus for performing scaling and rate reduction of an encoded information stream containing first parameters and first correlation coefficients in order to serve at least one of a plurality of heterogeneous devices, comprising:
   a. a scaling factor component for determining scaling factors from device capabilities of said at least one device, and
   b. a processing component for applying said scaling factors to said first parameters and first correlation coefficients to determine a new set of second parameters and second correlation coefficients, wherein said device can decode said second parameters and said second correlation coefficients.

11. The apparatus of claim 10 further comprising a filter for filtering said second parameters and second correlation coefficients to adjust the rate of the said stream.

12. The apparatus of claim 10 further comprising a receiver and wherein said determining said scaling factors comprises receiving input from said at least one device at said receiver.

13. prorgram storage device readable by machine tangibly embodying a program of instructions to cause said machine to perform a method for performing scaling and rate reduction of an encoded information stream containing first parameters and first correlation coefficients in order to serve at least one of a plurality of heterogeneous devices, said method comprising:
   a. determining scaling factors from device capabilities of said at least one device; and
   b. applying said scaling factors to said first parameters and first correlation coefficients to determine a new set of second parameters and second correlation coefficients, wherein said device can decode said second parameters and said second correlation coefficients.

14. The program storage device of claim 13 wherein said method further comprises filtering said second parameters and second correlation coefficients to adjust the rate of the said stream.

15. The program storage device of claim 13 wherein said determining said spatial and temporal scaling factors comprises receiving input from said at least one device.

16. The program storage device of claim 14 wherein said determining said spatial and temporal scaling factors comprises receiving input from said at least one device.

17. The program storage device of claim 13 wherein said scaling factors comprise spatial and temporal scaling factors.

18. A zooming tool for spatially scaling an encoded information stream containing first parameters and first correlation coefficients in order to serve a scaled stream to at least one of a plurality of heterogeneous devices, comprising:
   a. a scaling factor component for determining scaling factors from desired zooming level and the device capabilities of said at least one device; and
   b. a processing component for applying said scaling factors to said first parameters and first correlation coefficients to determine a new set of second parameters and second correlation coefficients, wherein said device can decode said second parameters and said second correlation coefficients.

19. The zooming tool of claim 18 further comprising a filter for filtering said second parameters and second correlation coefficients to adjust the rate of said stream.

20. The zooming tool of claim 18 further comprising a receiver and wherein said determining scaling factors comprises receiving input from said at least one device at said receiver.

* * * * *

UNITED STATES PATENT AND TRADEMARK OFFICE
CERTIFICATE OF CORRECTION

PATENT NO. : 6,628,300 B2
DATED : September 30, 2003
INVENTOR(S) : Amini et al.

It is certified that error appears in the above-identified patent and that said Letters Patent is hereby corrected as shown below:

Column 8,
Line 17, "prorgram storage device readable by machine tangibly" should read
-- A program storage device readable by machine tangibly --

Signed and Sealed this

Twenty-fifth Day of May, 2004

JON W. DUDAS
*Acting Director of the United States Patent and Trademark Office*